(12) United States Patent  
Balachandran et al.

(10) Patent No.: US 7,502,352 B2
(45) Date of Patent: Mar. 10, 2009

(54) SCHEDULING METHOD FOR QUALITY OF SERVICE DIFFERENTIATION FOR NON-REAL TIME SERVICES IN PACKET RADIO NETWORKS

(75) Inventors: Krishna Balachandran, Morganville, NJ (US); Kenneth C. Budka, Marlboro, NJ (US); Arnab Das, Washington, DC (US); Oded Hauser, Matawan, NJ (US); Wei Luo, Eatontown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1112 days.

(21) Appl. No.: 10/439,759

(22) Filed: May 16, 2003

(65) Prior Publication Data

US 2004/0228353 A1    Nov. 18, 2004

(51) Int. Cl.
*H04Q 7/24* (2006.01)
(52) U.S. Cl. .................. 370/338; 370/468; 370/329; 370/341
(58) Field of Classification Search ............ 370/395.21, 370/329
See application file for complete search history.

(56) References Cited

U.S. PATENT DOCUMENTS

| | | | | |
|---|---|---|---|---|
| 5,987,320 | A * | 11/1999 | Bobick | 455/423 |
| 6,178,235 | B1 * | 1/2001 | Petersen et al. | 379/134 |
| 6,701,151 | B2 * | 3/2004 | Diachina et al. | 455/452.1 |
| 6,856,812 | B1 * | 2/2005 | Budka et al. | 455/522 |
| 6,901,072 | B1 * | 5/2005 | Wong | 370/389 |
| 6,907,243 | B1 * | 6/2005 | Patel | 455/442 |
| 6,920,121 | B2 * | 7/2005 | Tan | 370/329 |
| 7,197,025 | B2 * | 3/2007 | Chuah | 370/338 |
| 2001/0048681 | A1 * | 12/2001 | Bilic et al. | 370/389 |
| 2002/0003783 | A1 * | 1/2002 | Niemela et al. | 370/329 |
| 2002/0191558 | A1 * | 12/2002 | Agrawal et al. | 370/329 |
| 2003/0035394 | A1 * | 2/2003 | Zeira et al. | 370/335 |
| 2003/0035396 | A1 * | 2/2003 | Haartsen et al. | 370/336 |
| 2003/0142637 | A1 * | 7/2003 | Khawer et al. | 370/318 |

* cited by examiner

*Primary Examiner*—Ajit Patel

(57) ABSTRACT

A method and apparatus for providing differentiated quality of service (QoS) within a GPRS/EGPRS network environment. The invention advantageously uses one or more of a microscheduling technique, a peak picking technique and other techniques and methodologies to provide differentiated quality of service levels to users while maximizing total network throughput.

23 Claims, 4 Drawing Sheets

SCHEDULING METHOD FOR QUALITY OF SERVICE DIFFERENTIATION FOR NON-REAL TIME SERVICES IN PACKET RADIO NETWORKS

BACKGROUND OF THE INVENTION

1. Technical Field of the Invention

The present invention relates to communication systems generally and, in particular, to a method and apparatus for scheduling traffic within a packetized radio services network.

2. Description of the Background Art

General packet radio services (GPRS) and enhanced general packet radio services (EGPRS) networks are used to communicate various data services between users or subscribers. In contrast to point-to-point links in wired-line networks (which exhibit low packet transmission error rates, high bandwidth and generally predictable transmission performance), transmission errors over a GPRS/EGPRS air link are common. In fact, due to variations in radio frequency (RF) link quality at different locations within a cellular region, different users sharing a time slot may experience different link quality at the same time. The observed transmission quality by each user varies over time due to fluctuations in signal strength and interference power, as well as changes in air link coding introduced by link adaptation. As such, approaches to managing the quality of service (QoS) designed for wired-line networks are not directly applicable to a GPRS/EGPRS air link.

SUMMARY OF THE INVENTION

The invention comprises a method and apparatus for providing user-perceivable quality of service (QoS) levels within a GPRS/EGPRS network environment. The invention advantageously uses one or more of a microscheduling technique, a peak picking technique and other techniques and methodologies to provide differentiated quality of service levels to users while maximizing total network throughput. Advantageously, the invention may be adapted to maximize revenues of a GPRS/EGPRS service provider.

BRIEF DESCRIPTION OF THE DRAWING

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention comprises a method and apparatus for providing differentiated quality of service (QoS) levels within a GPRS/EGPRS network environment. It has been noted that because of variations in RF link quality at different locations within a cell, different users sharing a timeslot will experience different link quality at the same time. This perceived transmission quality observed by each user allows a GPRS/EGPRS network operator to provide a novel QoS-differentiation feature as disclosed below. Namely, end users who are willing to pay more for use of the airlink will be provided with a higher quality of service, e.g., lower latencies, higher throughputs, or more predictable performance.

Figure 1:
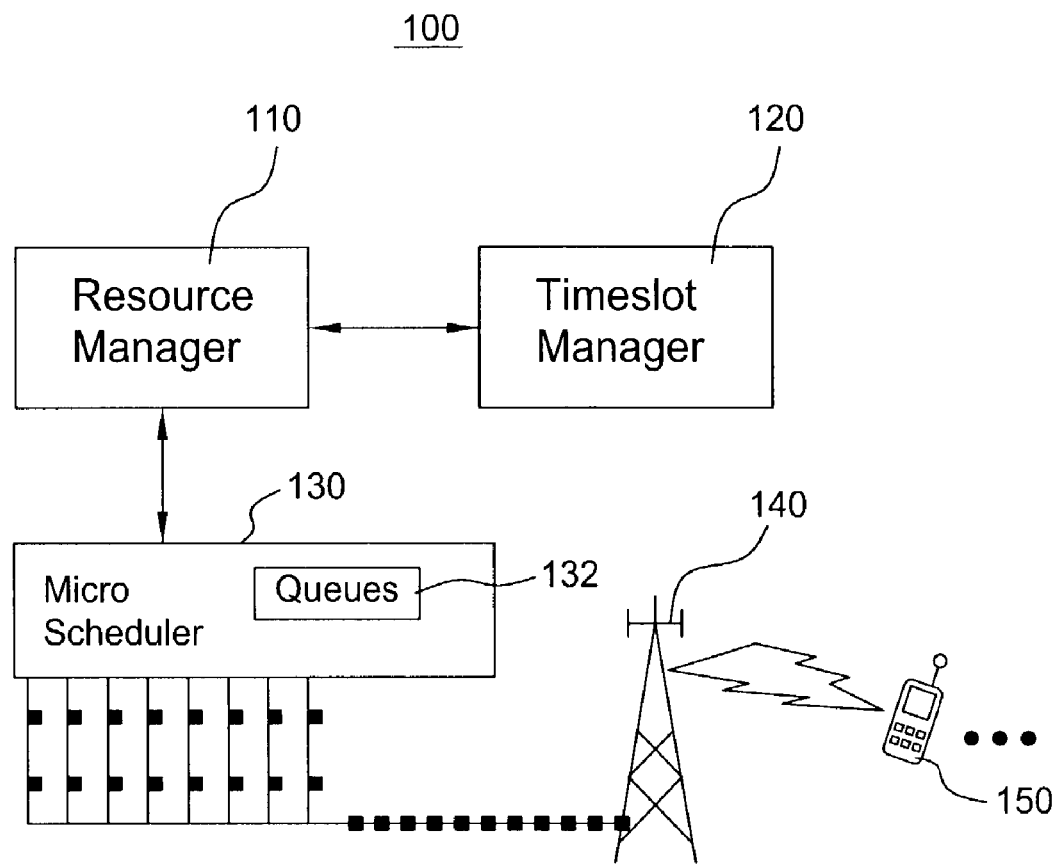
FIG. 1 illustrates a high-level block diagram of a GPRS network benefiting from the present invention.

FIG. 1 depicts a high-level block diagram of a GPRS network 100 benefiting from the present invention. The network comprises a resource manager 10, a timeslot manager 120 and a micro-scheduler 130. The resource manager 110 assigns uplink and downlink temporary block flows (TBFs) to timeslots. Assignment decisions take into account the current loading on each timeslot as well as the minimum and maximum throughput constraints of each user. The resource manager also reassigns temporary block flows to timeslots when the micro-scheduler 130 is unable to meet minimum logical link control (LLC) throughput constraints.

The micro-scheduler 130 assigns uplink and downlink blocks on each timeslot to mobile units 150 to satisfy their minimum and maximum rate constraints. In one embodiment, decisions can be made on the timescale of once every 20 milliseconds. The micro-scheduler 130 can optionally implement "peak picking" as disclosed below. It also decides whether to suspend mobile units if their block error rates are too high. Finally, the timeslot manager 120 decides when to request and release timeslots.

The present invention discloses a framework that will handle a plurality of QoS classes, and will also provide meaningful QoS differentiation for non-realtime services that can be easily extended to support realtime services. In brief, the present QoS-differentiation on the GPRS/EGPRS airlink for both realtime and non-realtime QoS classes is premised on guarantee of data transmission rate. Namely, the network tries to guarantee LLC data transmission rates between operator defined minimum and maximum values. The difference between realtime and non-realtime services is the time interval over which the rate must be enforced. Because of their stringent delay constraints, realtime services must be guaranteed a fixed number of airlink blocks over a relatively short time horizon (tens of milliseconds). In contrast, non-realtime services are not as delay sensitive. In providing QoS differentiation for non-realtime services, throughput guarantees can be enforced over longer timescales. Enforcing throughput guarantees over these longer timescales provides a scheduler with a great deal of flexibility. As discussed below, this flexibility is exploited to increase overall system capacity using a technique known as "peak picking."

For non-realtime services, the present invention will attempt to track LLC throughput targets over a relatively long timescale (>~3 seconds) for traffic which is not delay sensitive. Users transmitting/receiving a few kilobytes of data will perceive differences in performance, provided the minimum and maximum rates are defined appropriately. In other words, for classes which are not delay-sensitive, the present invention aims to differentiate the performance seen by users transmitting large volumes of data (e.g., a few kilobytes or more). There is a direct relationship between LLC throughputs and the time required to complete bulk data transfers, download web pages, and the like. In contrast, for delay-sensitive traffic classes the present invention will attempt to track LLC throughput targets over shorter timescales.

To explain the framework in greater detail, notations are defined as follows:

$R_{min}^j$ Target minimum LLC-layer throughput for all users in service class j. This is a tuneable parameter. (bps)

$R_{max}^j$ Target maximum LLC-layer throughput for users in service class j. This is a tuneable parameter. (bps)

$r_i^j$ LLC-layer throughput user i in service class j would receive if it were given all the transmission capacity on each timeslot assigned to its TBF. This throughput value reflects the efficiency of the RLC/MAC layer experienced by this mobile on timeslots assigned to it. This parameter is determined by the link adaptation algorithm, reflecting the estimated LLC data carrying capacity of the airlink under the MCS currently being used by the mobile and the prevailing radio conditions. (bps).

$S_i^j$ Set of timeslots allocated to user i in service class j. This set is determined by the resource allocation algorithm which allocates TBFs to timeslots.

$p_i^j(s)$ Fraction of airlink radio blocks on timeslot s allocated to user i in service class j. ($0 \leq p_i^j(s) \leq 1$.) This fraction is total amount of airlink resources allocated to this user on timeslot s for initial transmissions of RLC blocks, retransmissions of RLC blocks, and control messages. This parameter is calculated by the algorithm.

$c^j$ Revenue generated by carrying traffic for users in service class j. (E.g., lira/bps, $c^j \geq 0$.) This is a tuneable parameter.

In one embodiment, the present invention casts QoS-differentiation as a solution to the following linear program:

$$\max_{\vec{p}_i^j} \sum_j \sum_i \sum_{s \in S_i^j} c^j \cdot p_i^j(s) \cdot r_i^j \quad \text{(Equ. 1)}$$

subject to:

$$R_{\min}^j \leq \sum_{s \in S_i^j} p_i^j(s) \cdot r_i^j \leq R_{\max}^j, \forall i, j \quad \text{(Equ. 2)}$$

$$p_i^j(s) \geq 0, \forall i, j \quad \text{(Equ. 3)}$$

$$\sum_j \sum_i p_i^j(s) \leq 1, \forall s \quad \text{(Equ. 4)}$$

The objective function in (Equ.1) represents the total EGPRS/GPRS revenue the network operator will earn over the air interface. One goal of QoS differentiation feature is to select the fraction of airlink blocks to allocate to each user on each timeslot it is assigned (the vector $\vec{p}_i^j$) such that the network operator may maximize revenue, subject to the constraints outlined in (Equ. 2)-(Equ. 4). The revenue factors $c^j$ are fairly generic. If, for example, the revenue factor $c^j$ is equal for all classes, the solution to the linear program in (Equ. 1)-(Equ. 4) maximizes the total LLC throughput carried over the airlink, subject to the minimum and maximum throughput constraints in (Equ. 2). If the network operator uses volume-based pricing schedules for different user classes, the revenue factor ci can be selected to reflect the relative rates paid by each service class.

The constraint in (Equ. 2) embodies our notion of quality of service for EGPRS/GPRS airlinks. The term $$\sum_{s \in S_i^j} p_i^j(s) \cdot r_i^j$$

denotes the total LLC-layer throughput a user will receive under its allocation of physical layer bandwidth (radio blocks). Regardless of which coding scheme is used over the air interface, the network will try to guarantee each user a minimum LLC-layer throughput $R_{\min}^j$ measured over a timescale of seconds. Network operators provide service differentiation by assigning different user classes different minimum LLC throughput targets, the assumption being that users who pay more for GPRS/EGPRS service will be assigned higher minimum LLC-layer throughput targets.

The constraint in (Equ. 2) also allows the network operator to specify a maximum LLC-layer throughput target $R_{\max}^j$. Capping the maximum LLC-layer throughput gives service providers an additional mechanism for differentiating the service experienced by different user classes. For example, network operators may want to limit the maximum LLC-layer throughputs observed by users in a particular class even if additional airlink capacity is available. The downside to enforcing these limits is that it may leave airlink resources idle. The constraint in (Equ. 2) can also accommodate network operators who don't wish to keep airlink resources idle if there is traffic to send: setting $R_{\max}^j$ to infinity for all service classes achieves this result. The maximum target is an easy parameter for network operators to understand, and is an excellent measure of user-perceived performance.

The constraint in (Equ. 3) simply states that the fraction of airlink radio blocks allocated to any user cannot be a negative number. The constraint in (Equ. 4) simply states that the fraction of airlink blocks allocated to all users sharing timeslots cannot exceed 100%.

In one embodiment, the linear program has an extreme point solution with the following structural properties:

1) Each user i in each service class j is allocated at least enough airlink radio block capacity on each timeslot it has been assigned to satisfy its minimum LLC throughput limit.

2) Additional airlink radio block capacity is given to the mobile stations that can generate the largest revenue for the network operator, subject to the maximum LLC throughput constraint. For example, the mobile unit with the highest value of $c^j \cdot r_i^j$ is allocated additional capacity, until it hits its maximum throughput requirements (or there is no more data to send to the mobile). Then the mobile unit with the next highest value of $c^j \cdot r_i^j$ is allocated additional capacity until its maximum LLC-layer throughput is hit, and so on. This formulation is referred to as "peak picking," short term allocation of airlink resources to those mobile units that are currently capable of generating the most revenue for the network operator.

Although the present invention casts QoS differentiation as a linear program in one embodiment, the present invention is not so limited. Namely, if the linear program is not feasible, the constraint in (Equ. 2) can be relaxed.

The relaxation can be accomplished in such a way that each user class is given the same minimum rate, and the ratios of the minimum LLC rates allocated to different service classes are similar to the ratios of the target minima. Similarly, it may be advantageous to first try to satisfy LLC-constraints for those mobile units with the highest revenue per byte.

Thus, all resource allocation decisions can be cast in terms of the optimization framework in (Equ. 1) to (Equ.4). For example, if minimum LLC throughput constraints for all users cannot be satisfied, either TBFs need to be reassigned to timeslots (the set $s_i^j$ becomes decision variables), or additional timeslots are needed. The linear programming formulation also gives a framework for determining whether additional timeslots are needed. No additional timeslots will be requested if all mobile units are already at their maximum LLC throughputs. Additional timeslots may be needed if it is not possible to satisfy all minimum target LLC throughputs.

Alternatively, a network operator may sell radio blocks and is indifferent to how efficiently the blocks are used by different mobiles. A reasonable way of differentiating quality of service under this charging model is to attempt to provide each user with a suitable number of airlink blocks per second within minimum and maximum bounds, allocating additional blocks to users paying the highest price. Such service differentiation can also be treated by the linear program with a simple transformation of variables: setting $r_i^j=1$, $\forall i,j$, and letting $R_{min}^j$ and $R_{max}^j$ represent the minimum and maximum fraction of a timeslot (measured in airlink blocks) that should be allocated to users in class j.

Peak picking can substantially improve overall system capacity and system efficiency. Specifically, since LLC throughputs are enforced over timescales of seconds for traffic classes which are not delay sensitive, the QoS feature can take advantage of short-term variations in link quality observed by different users, i.e., giving the airlink to the users which will make the best use of the airlink. Peak-picking will allow operators to carry more data over the airlink, thereby improving the ability of network operators to generate revenue from the airlink. This is a useful method to incorporate in a QoS differentiation feature.

In practice, it will be a good idea to make minimum LLC constraints for each mobile class larger than 0. Peak picking in the absence of minimum LLC rate constraints may cause trouble for higher layer protocols such as TCP. It is important that all users get some opportunity to send and receive data to avoid inefficiencies cause by TCP retransmissions and broken TCP connections.

Returning to FIG. 1, the micro-scheduler 130 determines how airlink blocks not needed to carry RLC control blocks (PACCH) should be distributed among all active TBFs on the timeslots they have been assigned. When allocating blocks to TBFs, the micro-scheduler attempts to satisfy each TBF's minimum throughput constraints. Blocks in excess of those needed to satisfy minimum throughput constraints are assigned to the TBFs generating the highest revenue per airlink block (peak picking), subject to keeping throughputs below each user's maximum throughput constraints.

Figure 2:
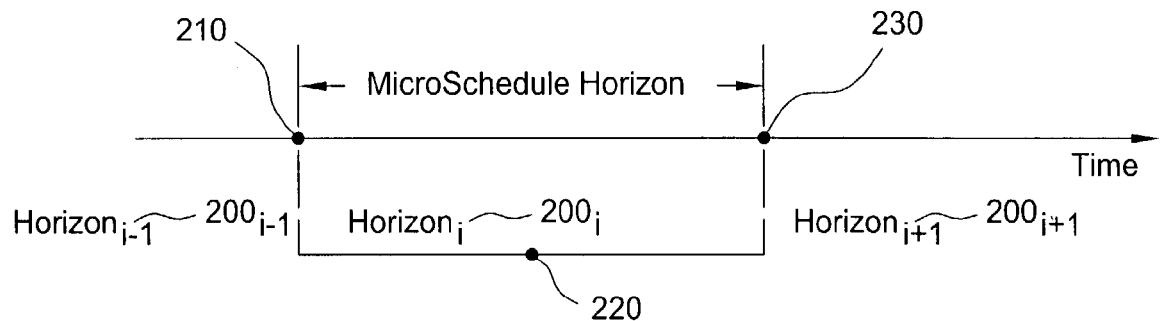
FIG. 2 illustrates a scheduling horizon.

FIG. 2 illustrates a scheduling horizon for the micro-scheduler. Specifically, to determine how blocks should be assigned to active TBFs, the micro-scheduler divides time into consecutive, fixed-length intervals $200_i$ as shown in FIG. 2. Each fixed length interval 200 is termed a "micro-schedule horizon." In one embodiment, the duration of a micro-schedule horizon is expected to be 200 milliseconds.

At the start 210 of each micro-schedule horizon, the micro-scheduler determines the minimum and maximum number of airlink blocks that should be allocated to each TBF over the duration of the scheduling horizon and on which timeslots the blocks should be transmitted. The minimum and maximum blocks are selected so that as much as possible, each mobile unit's minimum and maximum quality of service constraints will be satisfied at the end of the micro-schedule horizon. This determination is based on the amount of LLC-layer throughput that each user has received thus far and an estimate of the performance of the CS/MCS used by each mobile unit under current RF conditions. In calculating the minimum and maximum number of blocks that should be allocated to each TBF over the micro-schedule horizon, the micro-scheduler 130 assumes the airlink performance of each TBF at the start of the horizon will remain unchanged over the rather short micro-schedule horizon (e.g., 200 milliseconds). The micro-scheduler will attempt to compensate for any errors made by this assumption during subsequent micro-schedule horizons. The micro-scheduler determines the fraction of blocks should be allocated for "peak picking". It generates a "micro-schedule" as shown in FIG. 3, a plan of which airlink blocks should be allocated to which TBFs.

During the scheduling horizon 220, the micro-schedule is consulted once every 20 milliseconds on each time slot. Small changes are made on the fly to account for scheduling of PACCH blocks, the start of new TBFs, mobile units that do not have data to send, and so on.

At the start 230 of the next scheduling horizon, the micro-scheduler determines the minimum number of airlink blocks that should be allocated to each TBF over the duration of the scheduling horizon. It should be noted that these new totals may differ from previous scheduling intervals due to changes in the coding scheme, block errors, blocks that were pre-empted by PAACH blocks and so on.

Figure 3:
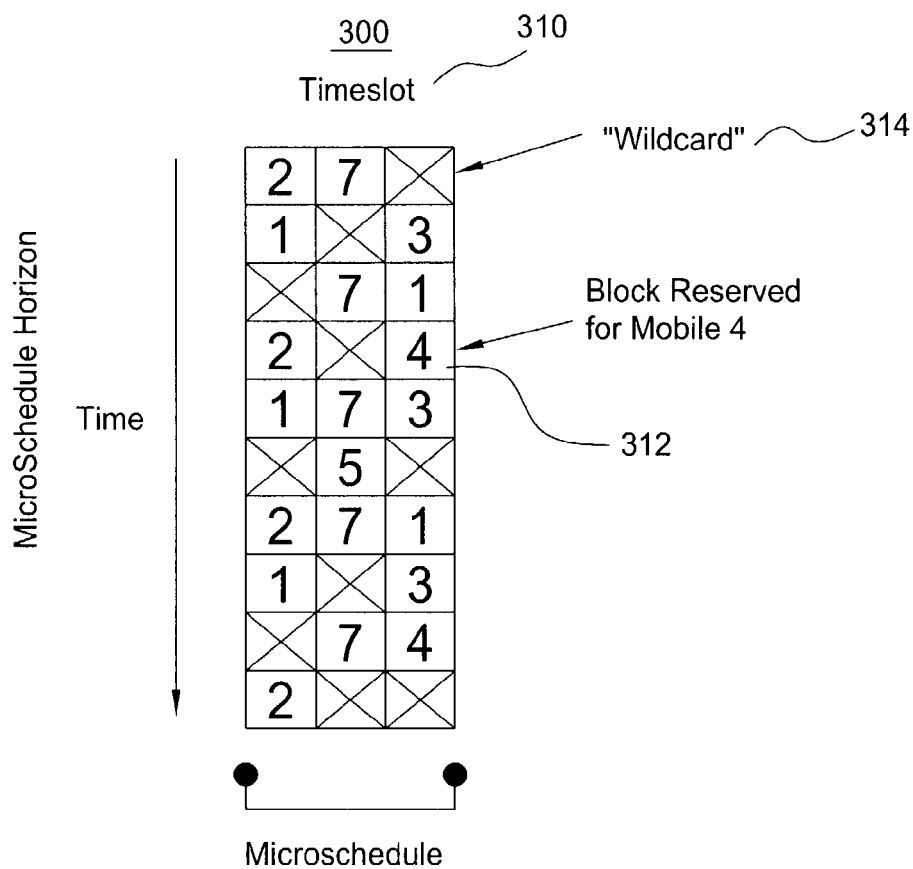
FIG. 3 illustrates a micro-schedule of the present invention.

Estimates of the minimum number of blocks that should be allocated to each mobile unit over the micro-schedule horizon are used to generate a micro-schedule 300 as shown in FIG. 3. A micro-schedule determines which blocks should be reserved for each mobile unit (e.g., a block 312 is reserved for mobile unit 4) on each timeslot 310 over a micro-schedule horizon. The number of reservations for each mobile unit in the micro-schedule is equivalent to the number of blocks needed for the mobile to satisfy its minimum LLC rate constraints and to "sound" the channel (as explained below). Unreserved blocks are termed "wildcards" 314, which can be used to pick peaks.

In addition, the micro-scheduler 130 may allocate a radio block for a TBF during a scheduling horizon even though one is not needed to satisfy its minimum throughput constraints. This allocation is useful because link adaptation and power control algorithms rely on a relatively steady stream of blocks between the network and the mobile unit to estimate RF conditions. If long periods of time pass without blocks flowing between the network and a mobile unit, the GPRS/EGPRS network will be unaware of the current RF conditions experienced by a mobile unit. Without the periodic transfer of blocks between the GPRS/EGPRS network and mobile units, power control algorithms will be forced to increase power to account for the uncertainty in channel conditions, and link adaptation algorithms will be forced to use more robust coding schemes that yield low throughputs. As a result, the airlink will be used inefficiently. To provide link adaptation and power control algorithms with up-to-date measurements of link quality, the micro-scheduler will periodically attempt to send/receive a block to/from each mobile unit with an active TBF. Periodic transfer of radio blocks for the sake of detecting the quality of the airlink is referred to as "channel sounding". The micro-scheduler 130 ensures that enough blocks are allocated to each TBF over the scheduling horizon for channel sounding.

Figure 4:
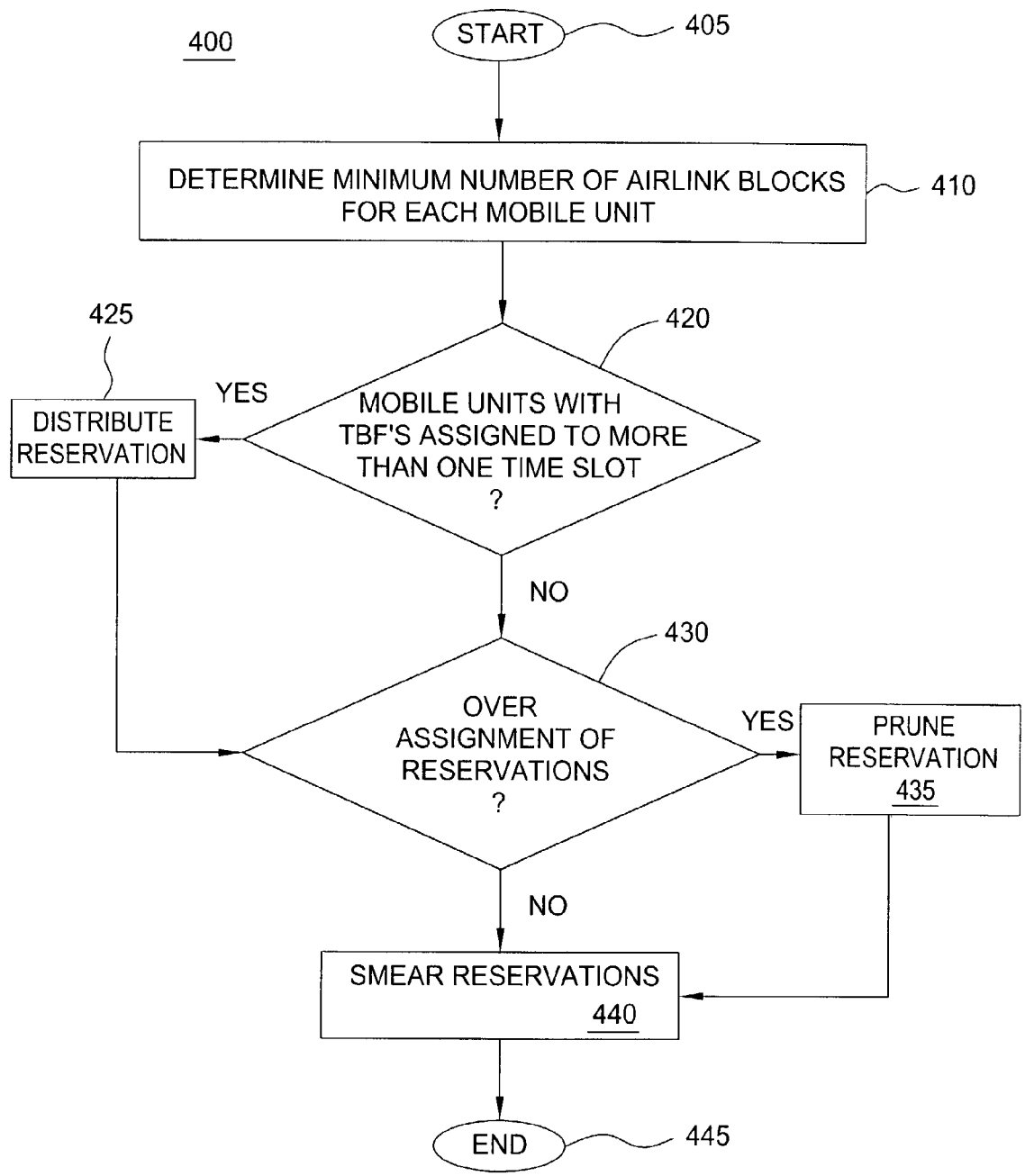
FIG. 4 illustrates a flowchart of a method for generating a micro-schedule of the present invention.

FIG. 4 illustrates a flowchart of a method 400 for generating a micro-schedule. Method 400 starts in step 405 and proceeds to step 410.

In step 410, method 400 determines the minimum number of airlink blocks for each mobile unit. Specifically, the micro-scheduler 130 determines the minimum number of airlink blocks that should be allocated to each mobile over the MicroSchedule horizon so as to satisfy minimum LLC throughput and channel sounding constraints.

In step 420, method 400 queries whether one or more mobile units with TBFs that are assigned to more than one time slot. If the query is negatively answered, then method 400 proceeds to step 430. If the query is positively answered, then method 400 proceeds to step 425 where the reservations are distributed among the timeslots. Specifically, for mobile units with TBFs assigned to more than one timeslot, the micro-scheduler must decide how to split up the reservations among the timeslots. In one embodiment, this is accomplished with a waterfilling heuristic. This packing heuristic attempts to balance the number of reserved blocks on each timeslot.

In step 430, method 400 queries whether there is an over assignment of reservations. If the query is negatively answered, then method 400 proceeds to step 440. If the query is positively answered, then method 400 proceeds to step 435 where some of the reservations are selected to be removed or pruned. Specifically, after applying the waterfilling heuristic to assign reservations to timeslots, it is possible that some timeslots will be allotted more reservations than there are transmission opportunities over the micro-schedule horizon.

For example, with a micro-schedule horizon lasting 200 milliseconds, at most 10 reservations can be allocated per timeslot in one embodiment. During periods of infeasibility, i.e., time intervals during which the scheduler finds it impossible to satisfy the minimum LLC rate constraints of one of more mobile units, it is possible that satisfying the minimum QoS requirements of the mobile units would require more than 10 reservations on a timeslot. In one embodiment, a heuristic algorithm is applied to remove reservations from one or more mobile units until the total number of reservations on each timeslot is less than or equal to 10. For example, those mobile units with a lower priority or generating the least revenue will get their reservations removed first. Reservations removed by the heuristic are moved to a priority queue. If during the scheduling horizon a mobile unit does not use its reservation, then mobile units holding reservations which were moved to the priority queue receive the first chance to use the available reservation.

In step 440, method 400 smears or spreads the reservations within the schedule horizon. Specifically, to optimize the micro-schedule, reserved blocks allocated to a particular mobile unit and wildcards are smeared as evenly as possible in time. This spreading is accomplished to maximize time diversity. Spreading of wildcards also allows new TBFs to be served with low delay. Method 400 ends in step 445.

It should be noted that generating a micro-schedule at the start of the horizon interval spares the system from having to make complicated scheduling decisions each time a downlink block must be sent, or a USF flag must be flipped, thereby saving processing cycles. Additionally, not all information needed to plan the precise order in which to send blocks over the micro-schedule horizon is available at the start of a micro-schedule horizon (e.g., when PACCH blocks will be sent, when new TBFs will start, when existing TBFs terminate and so on). Hence, the order in which blocks are assigned to different TBFs needs to be adapted on the fly, with the micro-schedule as a guide. To effect "on the fly" scheduling decisions, the present invention employs a "priority queue" and a "wildcard queue".

The priority queue 132 is used to store reservations needed by mobile units to satisfy their minimum throughput and channel sounding constraints. The priority queue holds reservations from TBFs that, due to infeasibility, cannot be placed in the micro-schedule. In one embodiment, reservations appearing in the priority queue are served in order of decreasing revenue/radio block (or based on priority), i.e., the TBF generating the highest revenue per radio block is served first, followed by the next highest, and so on.

Additionally, the priority queue is also used to hold reservations from TBFs that had reservations in the micro-schedule that were preempted by PACCH blocks. For example, if a block in the micro-schedule contained a reservation and that block is needed to carry a PACCH block, then that reservation is pushed to the priority queue. Thus, PACCH blocks have pre-emptive priority over reservations. Reservations moved to the priority queue because of PACCH pre-emption will get first chance to access wildcards later in the micro-schedule horizon.

The wildcard queue 132 is used to store "credits" for each TBF. The sum of reservations appearing in a micro-schedule, reservations appearing in the priority queue, and credits appearing in the wildcard queue for each TBF is equal to the maximum number of airlink blocks that may be allocated to the TBF over the period of the micro-schedule. In one embodiment, credits are also sorted in order of decreasing revenue/radio block. Thus, credits are used to ensure that when the micro-scheduler picks peaks, the throughput levels are kept at or below the TBF's maximum throughput constraint.

If a wildcard appears in the schedule, several rules are applied. First, if there are multiple elements in the priority queue, then the wildcard block is given to the mobile unit holding a reservation in the priority queue with the highest revenue/block, and the corresponding reservation is removed from the priority queue. (For downlink TBFs, the wildcard block is given to a mobile unit only if there is an RLC block, i.e., a new transmission, or a retransmission of a NACKed block that can be sent.)

Otherwise, the wildcard block is given to the mobile unit assigned to the timeslot which hasn't yet hit its maximum allocation for the micro-schedule horizon. This is accomplished by giving the block to the mobile unit with the highest revenue/block assigned to the timeslot which has a credit appearing in the wildcard queue, and then removing a credit for the selected mobile unit from the wildcard queue. (For downlink transmissions, the wildcard block is given to a mobile unit only if there is an RLC block, i.e., a new transmission, or a retransmission of a NACKed block that can be sent).

In general, if a reservation block appears in the micro-schedule, the airlink block is given to the mobile unit holding the reservation. (For downlink transmissions, the block is given to a mobile unit only if there is an RLC block, i.e., a new transmission, or a retransmission of a NACKed block that can be sent.) Otherwise, the reserved block becomes a "wildcard", and the rules for serving wildcard blocks above are applied.

Whenever airlink blocks are allocated to a TBF, counters are incremented to track the amount of LLC data carried on behalf of that TBF. This detailed tracking of the amount of LLC data carried on behalf of each TBF makes it possible for the micro-scheduler to determine the minimum and maximum number of blocks to allocate to each user at the start of each micro-schedule horizon.

In order to keep packet transfer delays low, TBFs that start after the micro-schedule horizon should be allocated blocks within the micro-schedule interval, if possible. This is accomplished by placing reservations and credits for the new TBF on the priority and wildcard queues. The number of reservations and credits placed in the queues is appropriate to satisfy the TBF's minimum and maximum throughput constraints over the time remaining in the micro-schedule horizon.

In one embodiment, the micro-scheduler 130 employs logic to track the amount of LLC data carried by the network on behalf of each TBF. This careful accounting allows the micro-scheduler to determine the minimum and maximum number of airlink blocks that should be allocated to each TBF over the course of a micro-schedule horizon.

Figure 5:
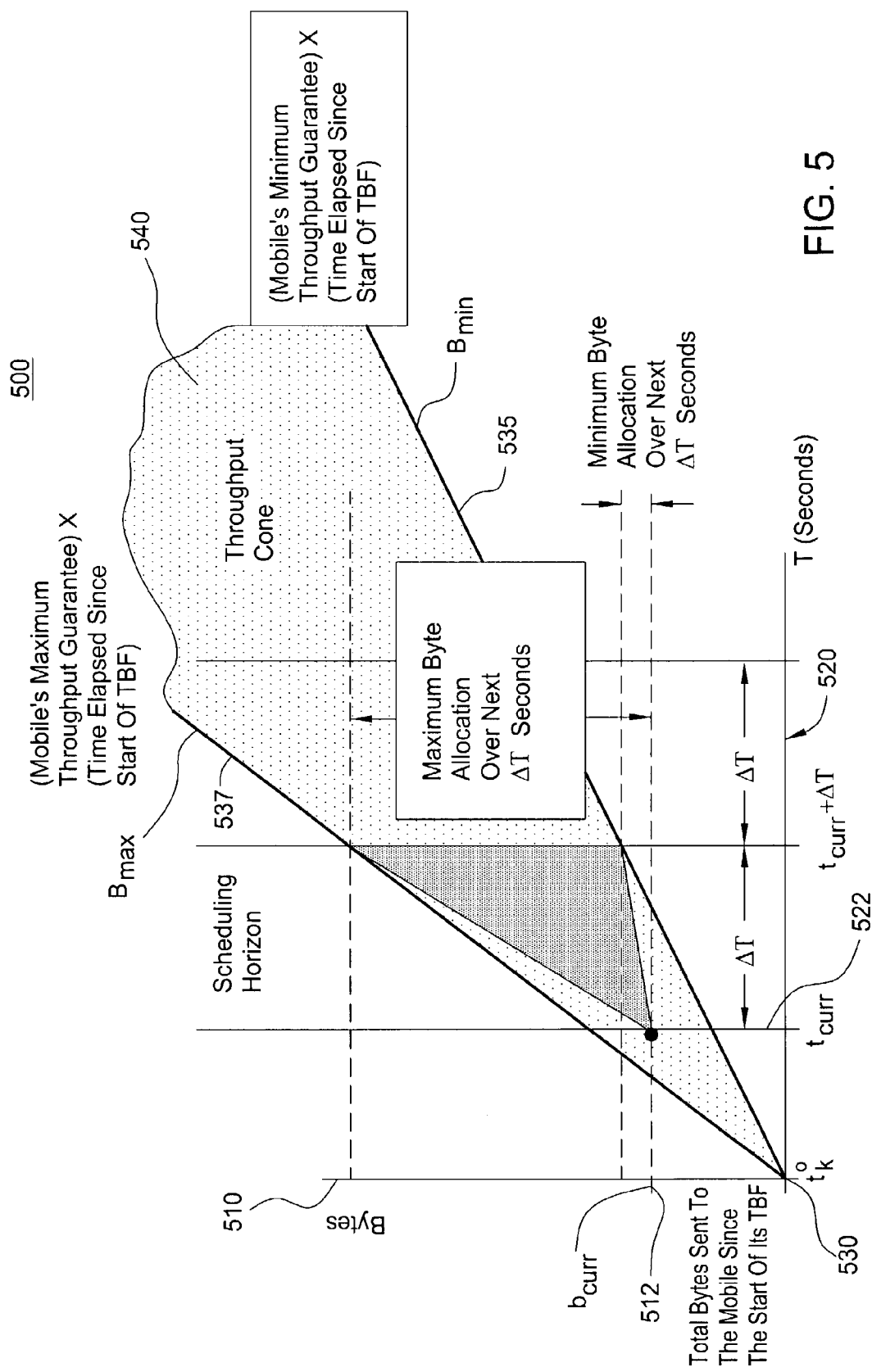
FIG. 5 illustrates a graph of a "throughput cone" of the present invention.

FIG. 5 illustrates a graph 500 of a "throughput cone" of the present invention. Specifically, FIG. 5 shows a plot of the cumulative number of LLC bytes 510 carried by the network on behalf of a TBF as a function of time 520. The origin, 0, 530 is the time at which the TBF was initiated. The lower border of the throughput cone, shown by the line $OB_{min}$ 535, denotes the minimum number of bytes that should be carried by the network on behalf of the TBF as a function of time if its LLC data were carried at precisely its minimum QoS rate constraint. Similarly, the upper border of the throughput cone, shown by the line $OB_{max}$ 537, denotes the maximum number of bytes that can be carried by the network on behalf of the TBF as a function of time if its LLC data were carried at precisely its maximum QoS rate constraint. The minimum and maximum QoS rate constraints determine the border of the throughput cone 540. At any time, provided the number of LLC bytes carried on behalf of a TBF lies within the corresponding throughput cone, then that TBF's minimum and maximum QoS rate constraints are being satisfied by the micro-scheduler.

If the number of bytes that have been carried on behalf of a TBF at the start of a micro-schedule horizon is known, the throughput cone can be used to determine the minimum and maximum number of LLC bytes which should be allotted to the TBF over the MicroSchedule horizon. (See FIG. 5.) If, in turn, the number of LLC bytes carried per radio block over the horizon is known a priori, then the micro-scheduler 130 can calculate the minimum and maximum number of radio blocks to allocate to the TBF over the horizon.

Specifically, a counter is used to track the amount of LLC bytes that have been carried by the network on behalf of a TBF. The rules for incrementing this cumulative byte counter can be implemented as follows:

1. If the radio block being transmitted is not a retransmission of a NACKed radio block, then the TBF's cumulative byte counter is incremented by the number of LLC-layer bytes contained in the radio block (the payload size of the current CS/MCS being used).

2. "Use it or lose it" rule: In the case a downlink, if TBF has a reservation in the MicroSchedule but has nothing to send (there is no LLC data queued for the TBF in the system), then the TBF's cumulative byte counter is incremented by the payload size of the current CS/MCS being used.

The rationale behind this so-called "use it or lose it" rule is best motivated by a simple example. In FIG. 5 . $t_{curr}$ 522 denotes the current time, and $b_{curr}$ 512 denotes the number of bytes sent by the network to the mobile unit so far. The current micro-schedule horizon starts at time $t_{curr}$ and ends at time $t_{curr}+\Delta T$. If the TBF's buffers are empty during the current micro-schedule horizon, and the counters are not incremented, then the difference between $b_{curr}$ and the value of the line $OB_{min}$ at time $t_{curr}+2\Delta T$ denotes the number of bytes that must be transmitted to the mobile unit during the next micro-schedule horizon in order to meet the mobile unit's minimum QoS rate requirements. It is easy to see now that if the TBF's buffers are empty for several successive micro-schedule horizons, then the amount of airlink resources that will be needed to meet the mobile unit's minimum QoS requirements will be more than what is available. The reason this situation arose is because the TBF's buffers were empty. However, QoS guarantees are meaningful only when data is available to be sent to the mobile unit or if the TBF's offered load is no smaller than the minimum QoS rate. In keeping with this approach, in one embodiment, the present invention adopts the "use it or lose it" rule. Under this rule, it is clear that as long as adequate reservations are made for the TBF in each micro-schedule horizon, the counter will lie within the throughput cone of the TBF even if buffers are empty.

3. If a wildcard block appears in the micro-schedule, a TBF assigned to the timeslot with a reservation in the priority queue is given an opportunity to transmit a radio block. (Recall that a reserved block is placed in the priority queue in the event of infeasibility, if the TBF's reservation is pre-empted by a PACCH block, or if the TBF began after the start of the micro-schedule horizon.) Thus, this transmission opportunity given to a TBF in the priority queue is part of that needed by the TBF to meet its minimum QoS rate. Thus, as in case 2 above, the cumulative byte counter is incremented in the event of a new or fresh transmission, or, for a downlink TBF, if there is no new LLC-data to send on the TBF. The latter is in keeping with the above "use it or lose it" rule.

4. In case that there are no reservations appearing in the priority queue for TBFs assigned to the timeslot, (or, for downlink TBFs, TBFs with reservations in the priority queue do not have an RLC block to send), then a TBF assigned to the timeslot with credits in the wildcard queue is given an opportunity to transmit. The cumulative byte counter is incremented in the event of a new or fresh transmission. If, however, the TBF's buffers are empty, then the counter is left unchanged. The reason the "use it or lose it" rule is not applied here is because a wildcard transmission is not required to meet the mobile unit's minimum QoS requirements. The transmission is intended for "peak-picking" or to maximize the network operator's revenue. Thus, the counter will continue to remain within the corresponding throughput cone even if it is left unchanged.

5. In case of uplink TBFs, the "use it or lose it" rule cannot be applied because the state of the uplink TBF's buffers are not known to the system.

Following the above rules allows the present invention to track the amount of LLC bytes carried by the network on behalf of the TBF. Since in some cases the counter is incremented when a mobile unit does not send LLC data, the counter will be referred to as a "virtual bit" counter.

An example of the airlink block determining step 410 of FIG. 4 is now presented. At the beginning of each micro-schedule horizon, the present invention calculates the minimum and maximum number of LLC bits that may be allocated to each TBF. To that end, the present invention denotes $Bits_{min\ QoS,k}^{DL}$ the number of LLC bits that must be transmitted for TBF k from the time the TBF began until the end of the current micro-schedule horizon in order to satisfy TBF k's minimum downlink QoS rate constraint. At the beginning of every micro-schedule horizon, $Bits_{min\ QoS,k}^{DL}$ is incremented by an amount, that equals the product of TBF k's minimum downlink QoS transmission rate ($R_{min\ QoS,k}^{DL}$) and the duration of the micro-schedule horizon ($T_{schd}$). Similarly, $Bits_{max\ QoS,k}^{DL}$. which denotes the maximum number of LLC bits that can be transmitted for TBF k from the time the TBF began until the end of the current micro-schedule horizon, is incremented by the product of TBF k's maximum downlink QoS transmission rate ($R_{max\ QoS,k}^{DL}$) and $T_{schd}$ at the beginning of the micro-schedule horizon. The present invention denotes $Virt\_Bits_k^{DL}$ the number of "effective bits" that have actually been transmitted for TBF k. The goal of the micro-scheduler is to meet the inequality below in every micro-schedule horizon as much as possible:

$$Bits_{min\ QoS,k}^{DL} \leq Virt\_Bits_k^{DL} \leq Bits_{max\ QoS,k}^{DL} \quad \text{(equ. 5)}$$

In order to prevent the gap between $Bits_{max\ QoS,k}^{DL}$ and $Bits_{min\ QoS,k}^{DL}$ from growing during the idle period of a TBF, the present invention applies the notion of "freezing." If a TBF is empty for the entire duration of a micro-schedule horizon, and $Virt\_Bits_k^{DL}$ equals $Bits^{min\ QoS,kDL}$ the TBF is frozen and the freeze flag $flag_{freeze,k}^{DL}$ is set to 1. For a frozen TBF, $Bits_{min\_QoS,k}^{DL}$ and $Bits_{max\_QoS,k}^{DL}$ are not incremented at the beginning of a micro-schedule horizon. In addition, the variable $Virt\_Bits_k^{DL}$ is left unchanged during the scheduling interval. When a frozen TBF becomes active, it is "defrosted", and its freeze flag is reset.

$Bits_{min\_QoS,k}^{DL}$ is next translated into $Min\_Qs_k^{DL}$ which is the minimum and maximum number of radio blocks that need to be transmitted to the TBF in the current scheduling interval in order to satisfy its minimum QoS requirement. Similarly, $Bits_{max\_QoS,k}^{DL}$ is translated into $Max\_QS_k^{DL}$ which denotes the maximum number of radio blocks that can be sent to the TBF in the current scheduling interval. In addition, the present invention also calculates the number of sounding blocks $N_{sounding,k}^{DL}$ that should be transmitted. Clearly, the minimum number of blocks $Min\_QS_k^{DL}$ has to be no less than $N_{sounding,k}^{DL}$.

Next, TBFs are assigned a ranking or priority based on its revenue generating potential. Thus, the priority depends on $C_k^{DL}$, $block\_size_{eff,k}^{DL}$ and $Min\_QS_k^{DL}$. TBFs in the wildcard queue are ordered based on this priority. In addition, in situations where no feasible solution can be obtained that satisfy the minimum QoS requirement for all the TBFs assigned to a given timeslot, the present invention tries to meet the minimum requirements for the TBFs with a higher priority.

An example of assignment of blocks to timeslots is now presented. After calculating $Min\_QS_k^{DL}$ for each TBF for the next scheduling interval, the present invention determines how to distribute $Min\_QS_k^{DL}$ between the timeslots assigned to the TBF. Specifically, the present invention needs to determine $A_k^{j,DL}$ the number of blocks assigned to TBF k on timeslot j, such that $$Min\_QS_k^{DL} = \sum_j A_k^{j,DL}.$$

These assignments will be called reservations in the sequel.

It should be noted that the total number of radio blocks that can be transmitted on each timeslot in any micro-schedule horizon is limited to $N_{blk}$. As a result, it may not be possible to find a feasible solution that satisfies the minimum QoS requirement, or equivalently, $Min\_QS_k^{DL}$, for all mobile units within a scheduling interval. In such a situation, the present invention attempts to maximize the number of TBFs for whom the minimum requirements are met.

The present invention determines $A_k^{j,DL}$ in two steps. In the first step, the present invention uses a "water-filling" method to distribute the radio blocks of each TBF among the timeslots it is assigned. This method attempts to balance the total number of reservations on each timeslot without taking into account possible infeasibilities in the assignment. In other words, at the end of the first step it is possible that $$\sum_k A_k^{j,DL} > N_{blk}$$

for some timeslot j. Note that the load on timeslot j, denoted $Load_j^{DL}$ equals $$\sum_k A_k^{j,DL}.$$

Specifically, the water-filling algorithm works on TBFs sequentially: allocating blocks for single-slot TBFs first, followed by two-slot TBFs, and so on. TBFs that have been assigned the same number of timeslots are handled in an order determined by the value of $Min\_QS_k^{DL}$, starting with the TBF with the largest $Min\_QS^{kDL}$.

A timeslot to which a TBF has been assigned may already contain reservations for other TBFs from earlier iterations of the algorithm. At each iteration, the algorithm finds a value C (also called "water-level"), such that on all timeslots assigned to the TBF, it holds that $$A_k^{j,DL} = \begin{cases} C - Load_j^{DL}, & \text{if } Load_j^{DL} \leq C, \\ 0, & \text{if } Load_j^{DL} > C, \end{cases} \quad \text{(Equ. 6)}$$

$$\text{and } \sum_j A_k^{j,DL} = Min\_QS_k^{DL}.$$

Note that the solution to the values of c and $A_k^{j,DL}$ obtained from the equations above need not be integer-valued. Clearly, such a solution is not acceptable because non-integer reservations are not possible. Thus, any rounding operations based on a particular implementation can be employed to guarantee integer-valued solutions for $A_k^{j,DL}$. For example, these operations may minimize $$\max_j Load_j^{DL} - \min_j Load_j^{DL},$$

which equals the maximum difference in the loading of the different timeslots.

In the second step, the present invention takes into account possible infeasibilities in the assignments in the first step. As mentioned above, one goal is to maximize the number of TBFs for whom the minimum QoS requirements are satisfied. To that end, the present invention checks each timeslot j to see if $Load_j^{DL} > N_{blk}$. If $Load_j^{DL}$ is greater than $N_{blk}$, then the present invention removes the reservations, except for the sounding blocks, of the TBFs in the order of their priorities, starting with the TBF with the lowest priority. This procedure continues until the infeasibility is repaired, i.e., $Load_j^{DL} = N_{blk}$. It is possible that even after removing all the reservations, except for the sounding blocks, of all the TBFs assigned to timeslot j, $Load_j^{DL}$ is still greater $N_{blk}$. In that case, the present invention starts removing the sounding blocks as well until the infeasibility is repaired. TBFs whose reservations have been removed are placed in a priority queue in the order of their respective priorities. In one embodiment, the TBF with the highest priority among the TBFs in the priority queue appears at the head of the queue.

Although various embodiments that incorporate the teachings of the present invention have been shown and described in detail herein, those skilled in the art can readily devise many other varied embodiments that still incorporate these teachings.

What is claimed is:

1. A method for providing differentiated quality of service over a radio services network, said method comprising the steps of:

determining a minimum number of airlink blocks for at least one mobile unit based upon a priority setting associated with said at least one mobile unit;

reserving said minimum number of airlink blocks to said at least one mobile unit for a small period of time, wherein a plurality of airlink blocks that are not reserved during said small period of time are considered to be wildcard airlink blocks that are available to be reserved to said at least one mobile unit; and applying peak picking.

2. The method of claim 1, wherein said peak picking comprises the step of reserving available airlink blocks to said at least one mobile unit such that a maximum threshold of airlink blocks is reached for said at least one mobile unit.

3. The method of claim 1, wherein said reservation of said minimum number of airlink blocks is stored in a schedule.

4. The method of claim 3, further comprising the step of:
consulting said schedule to determine if rescheduling of airlink blocks is necessary.

5. The method of claim 4, wherein said rescheduling of airlink blocks is performed on the fly to account for scheduling of PACCH blocks, a start of a new TBF, or non-usage of airlink blocks reserved t said at least one mobile unit.

6. The method of claim 1, wherein said determining step determines said minimum number of airlink blocks is based on a throughput threshold for said at least one mobile unit.

7. The method of claim 6, where said throughput threshold is computed to maximize revenue generation.

8. The method of claim 1, wherein said reserving step reserves said minimum number of airlink blocks to account for channel sounding.

9. The method of claim 1, further comprising the step of:
distributing said reserved minimum number of airlink blocks over a plurality of time slots.

10. The method of claim 9, wherein said distributing step distributes said reserved minimum number of airlink blocks over a plurality of time slots in accordance with a heuristic method.

11. The method of claim 1, wherein said reserved airlink blocks and said wildcard airlink blocks are distributed evenly in time within said small period of time.

12. The method of claim 1, wherein said availability of said wildcard airlink blocks is used for future scheduling of airlink blocks to be reserved for said at least one mobile unit.

13. The method of claim 1, further comprising the step of:
maintaining a priority queue for storing a reservation that is needed to satisfy said minimum number of airlink blocks to said at least one mobile unit.

14. The method of claim 1, further comprising the step of:
maintaining a wildcard queue for storing a credit for each of said at least one mobile unit.

15. The method of claim 1, where said determining step further determines a maximum number of airlink blocks for said at least one mobile unit based upon said priority setting associated with said at least one mobile unit.

16. An apparatus for providing differentiated quality of service over a radio services network, said apparatus comprising:
means for determining a minimum number of airlink blocks for at least one mobile unit based upon a priority setting associated with said at least one mobile unit;
means for reserving said minimum number of airlink blocks to said at least one mobile unit for a small period of time, wherein a plurality of airlink blocks that are not reserved during said small period of time are considered to be wildcard airlink blocks that are available to be reserved to said at least one mobile unit; and
means for applying peak picking.

17. The apparatus of claim 16, wherein said means for applying peak picking reserves available airlink blocks to said at least one mobile unit such that a maximum threshold of airlink blocks is reached for said at least one mobile unit.

18. The apparatus of claim 16, wherein said reservation of said minimum number of airlink blocks is stored in a schedule.

19. The apparatus of claim 18, further comprising:
means for consulting said schedule to determine if rescheduling of airlink blocks is necessary.

20. A computer-readable medium having stored thereon a plurality of instructions, the plurality of instructions including instructions which, when executed by a processor, cause the processor to perform the steps comprising of:
determining a minimum number of airlink blocks for at least one mobile unit based upon a priority setting associated with said at least one mobile unit;
reserving said minimum number of airlink blocks to said at least one mobile unit for a small period of time, wherein a plurality of airlink blocks that are not reserved during said small period of time are considered to be wildcard airlink blocks that are available to be reserved to said at least one mobile unit; and
applying peak picking.

21. The computer-readable medium of claim 20, wherein said peak picking comprises the step of reserving available airlink blocks to said at least one mobile unit such that a maximum threshold of airlink blocks is reached for said at least one mobile unit.

22. The computer-readable medium of claim 20, wherein said reservation of said minimum number of airlink blocks is stored in a schedule.

23. The computer-readable medium of claim 22, further comprising the step of:
consulting said schedule to determine if rescheduling of airlink blocks is necessary.

* * * * *